(12) United States Patent
Brook

(10) Patent No.: US 11,687,393 B2
(45) Date of Patent: Jun. 27, 2023

(54) COMPUTER-IMPLEMENTED METHODS, APPARATUS, COMPUTER PROGRAMS, AND NON-TRANSITORY COMPUTER READABLE STORAGE MEDIUMS FOR DETERMINING A VALUE OF A PARAMETER OF A SYSTEM

(71) Applicant: ROLLS-ROYCE PLC, London (GB)

(72) Inventor: Anthony J Brook, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/587,316

(22) Filed: Jan. 28, 2022

(65) Prior Publication Data
US 2022/0308951 A1 Sep. 29, 2022

(30) Foreign Application Priority Data
Feb. 9, 2021 (GB) ...................... 2101736

(51) Int. Cl.
*G06F 11/00* (2006.01)
*G06F 11/07* (2006.01)

(52) U.S. Cl.
CPC ........ *G06F 11/076* (2013.01); *G06F 11/0736* (2013.01)

(58) Field of Classification Search
CPC ............... G06F 11/076; G06F 11/0736; G06F 11/0739; G06F 11/3013; G06F 11/0754
See application file for complete search history.

(56) References Cited

U.S. PATENT DOCUMENTS

| 6,098,011 A | 8/2000 | Scott |
| 10,041,808 B2 | 8/2018 | Guillet et al. |
| 11,073,408 B2 | 7/2021 | Riedmueller et al. |
| 2004/0015282 A1* | 1/2004 | Babala .................. G01L 27/007 701/70 |
| 2005/0228619 A1* | 10/2005 | Burnet ..................... G01D 3/08 702/189 |
| 2008/0161664 A1 | 7/2008 | Mastrototaro |
| 2017/0185428 A1* | 6/2017 | Kohlenberg ........ G06F 11/0751 |
| 2018/0365974 A1* | 12/2018 | Haas ..................... G01R 33/07 |
| 2019/0265324 A1* | 8/2019 | Bilbao De Mendizabal ............... G01R 33/0023 |

(Continued)

FOREIGN PATENT DOCUMENTS

| EP | 1 452 936 A2 | 9/2004 |
| EP | 1591951 A2 | 11/2005 |
| EP | 3 246 547 A1 | 11/2017 |

OTHER PUBLICATIONS

Aug. 5, 2021 Search Report issued in British Patent Application No. 2101736.3.

(Continued)

*Primary Examiner* — Joseph D Manoskey
(74) *Attorney, Agent, or Firm* — Oliff PLC

(57) ABSTRACT

A computer-implemented method comprising: receiving a first signal from a first sensor, the first signal having a first value; receiving a second signal from a second sensor, the second signal having a second value, the first signal and the second signal being measurements of a parameter of a system; receiving a third signal having a third value; determining a first absolute error using the first value, the second value and the third value; and comparing the first absolute error with at least one threshold to determine a signal value.

18 Claims, 8 Drawing Sheets

(56) References Cited

U.S. PATENT DOCUMENTS

| | | |
|---|---|---|
| 2019/0310113 A1 | 10/2019 | Riedmueller |
| 2020/0248622 A1 | 8/2020 | Crowley et al. |
| 2020/0302705 A1 | 9/2020 | Ismail et al. |
| 2020/0334099 A1* | 10/2020 | Hayes ................. G06F 11/0721 |

OTHER PUBLICATIONS

Jun. 17, 2022 Search Report issued in European Patent Application No. 22153389.6.

* cited by examiner

COMPUTER-IMPLEMENTED METHODS, APPARATUS, COMPUTER PROGRAMS, AND NON-TRANSITORY COMPUTER READABLE STORAGE MEDIUMS FOR DETERMINING A VALUE OF A PARAMETER OF A SYSTEM

CROSS-REFERENCE TO RELATED APPLICATIONS

This specification is based upon and claims the benefit of priority from UK Patent Application Number 2101736.3 filed on 9 Feb. 2021, the entire contents of which are incorporated herein by reference.

TECHNOLOGICAL FIELD

The present disclosure concerns computer-implemented methods, apparatus, computer programs, and non-transitory computer readable storage mediums for determining a value of a parameter of a system

BACKGROUND

Systems, such as gas turbine engines, usually have a plurality of operational parameters when in use. The parameters may be measured by sensors to determine whether the system is operating within certain limits. Accurate measurement of some parameters may be essential to the efficient and safe operation of the system. For such parameters, the system may comprise two sensors to measure the same parameter so that if one sensor becomes inoperable, a value is still received from the other sensor. However, where the values measured by the two sensors differ and are both non-zero, the operation of the system may need to be interrupted to determine the correct parameter value (for example, to determine whether one of the sensors is faulty). The interruption of the system may be costly to the system operator, and may not be possible in some instances (for example, where the system is a gas turbine engine mounted on an airborne aircraft).

BRIEF SUMMARY

According to a first aspect there is provided a computer-implemented method comprising: receiving a first signal from a first sensor, the first signal having a first value; receiving a second signal from a second sensor, the second signal having a second value, the first signal and the second signal being measurements of a parameter of a system; receiving a third signal having a third value; determining a first absolute error using the first value, the second value and the third value; and comparing the first absolute error with at least one threshold to determine a signal value.

Determining the first absolute error may comprise: calculating a second absolute error using the first value and the third value; calculating a third absolute error using the second value and the third value; and calculating the first absolute error using the second absolute error and the third absolute error.

Comparing the first absolute error with at least one threshold may comprise: determining if the first absolute error is greater than or equal to zero, and less than a first threshold; determining an average of the first value and the second value when the first absolute error is determined to be greater than or equal to zero, and less than the first threshold; and selecting the average of the first value and the second value as the signal value.

Comparing the first absolute error with at least one threshold may comprise: determining if the first absolute error is greater than or equal to a second threshold; determining which of the first value and the second value is closest to the third value of the third signal when the first absolute error is determined to be greater than or equal to the second threshold; and selecting the value determined to be closest to the third value from the first value and the second value as the signal value.

Comparing the first absolute error with at least one threshold may comprise: determining if the first absolute error is greater than or equal to a first threshold, and less than a second threshold; determining an average of the first value and the second value when the first absolute error is determined to be greater than or equal to the first threshold, and less than the second threshold; and interpolating a value between the average of the first value and the second value, and a fourth value; and selecting the interpolated value as the signal value.

Comparing the first absolute error with at least one threshold may further comprise: determining which of the first value and the second value is closest to the third value of the third signal when the first absolute error is determined to be greater than or equal to the first threshold, and less than the second threshold, the fourth value being the value determined to be closest to the third value of the third signal.

Comparing the first absolute error with at least one threshold may further comprise: determining which of the first value and the second value is highest, the fourth value being the value determined to be the highest value.

Comparing the first absolute error with at least one threshold may further comprise: determining which of the first value and the second value is lowest, the fourth value being the value determined to be the lowest value.

The fourth value may be a predetermined value stored in a memory.

According to a second aspect there is provided an apparatus comprising: a controller configured to: receive a first signal from a first sensor, the first signal having a first value; receive a second signal from a second sensor, the second signal having a second value, the first signal and the second signal being measurements of a parameter of a system; receive a third signal having a third value; determine a first absolute error using the first value, the second value and the third value; and compare the first absolute error with at least one threshold to determine a signal value.

Wherein to compare the first absolute error with at least one threshold, the controller may be configured to: determine if the first absolute error is greater than or equal to zero, and less than a first threshold; determine an average of the first value and the second value when the first absolute error is determined to be greater than or equal to zero, and less than the first threshold; and select the average of the first value and the second value as the signal value.

Wherein to compare the first absolute error with at least one threshold, the controller may be configured to: determine if the first absolute error is greater than or equal to a second threshold; determine which of the first value and the second value is closest to the third value of the third signal when the first absolute error is determined to be greater than or equal to the second threshold; and select the value determined to be closest to the third value from the first value and the second value as the signal value.

Wherein to compare the first absolute error with at least one threshold, the controller may be configured to: determine if the first absolute error is greater than or equal to the first threshold, and less than the second threshold; determine an average of the first value and the second value when the first absolute error is determined to be greater than or equal to the first threshold, and less than the second threshold; and interpolate a value between the average of the first value and the second value, and a fourth value; and select the interpolated value as the signal value.

Wherein to compare the first absolute error with at least one threshold, the controller may be configured to: determine which of the first value and the second value is closest to the third value of the third signal when the first absolute error is determined to be greater than or equal to the first threshold, and less than the second threshold, the fourth value being the value determined to be closest to the third value of the third signal.

Wherein to compare the first absolute error with at least one threshold, the controller may be configured to: determine which of the first value and the second value is highest, the fourth value being the value determined to be the highest value.

Wherein to compare the first absolute error with at least one threshold, the controller may be configured to: determine which of the first value and the second value is lowest, the fourth value being the value determined to be the lowest value.

The fourth value may be a predetermined value stored in a memory.

According to a third aspect there is provided a computer program that, when executed by a computer, causes performance of the computer-implemented method as described in the preceding paragraphs.

According to a fourth aspect there is provided a non-transitory computer readable storage medium comprising computer readable instructions that, when executed by a computer, cause performance of the method as described in the preceding paragraphs.

According to a fifth aspect there is provided a signal comprising computer readable instructions that, when executed by a computer, cause performance of the method as described in the preceding paragraphs.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
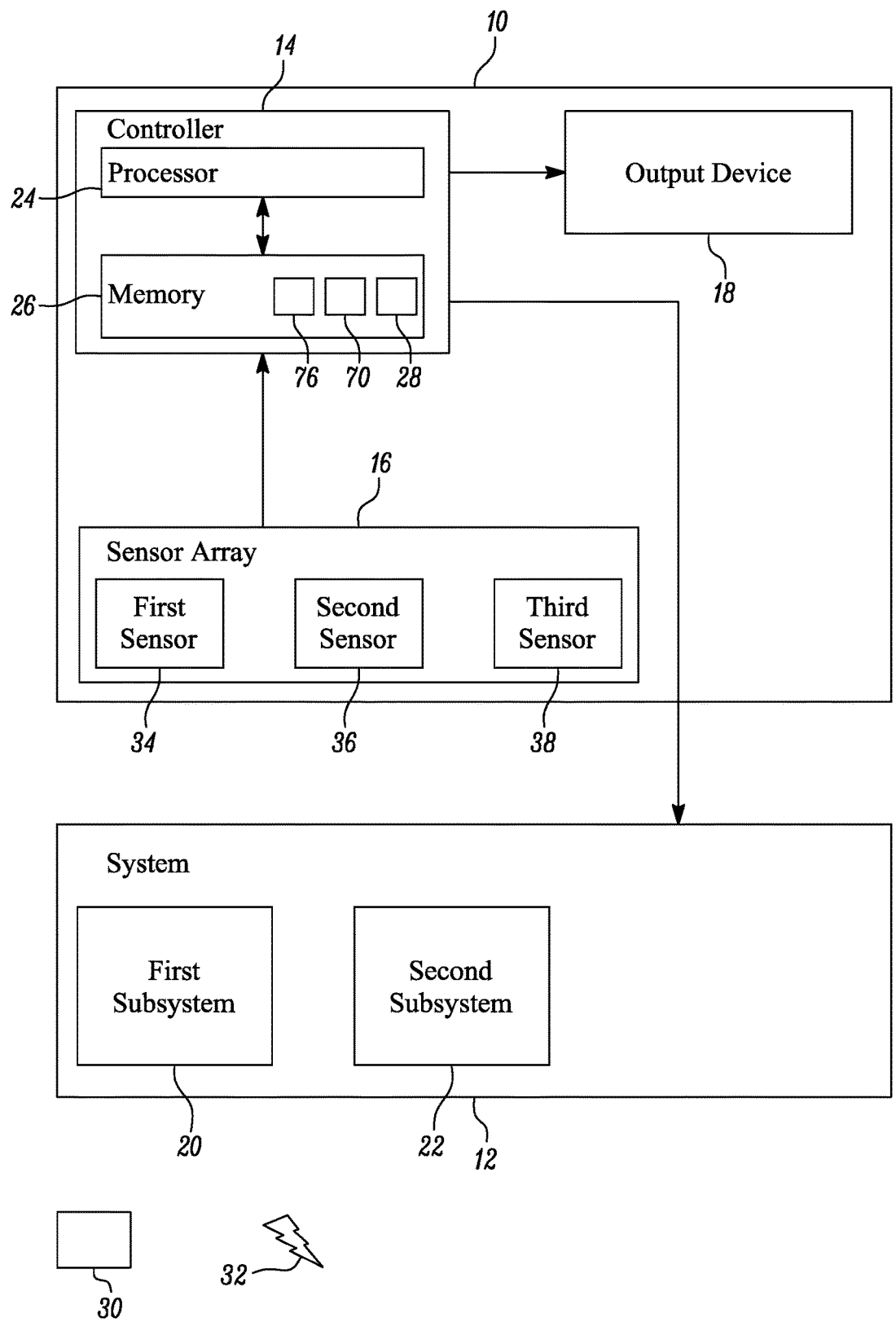
FIG. 1 illustrates a schematic diagram of a system and an apparatus according to various examples.

FIG. 1 illustrates a schematic diagram of an apparatus 10 and a system 12 according to various examples. The apparatus 10 includes a controller 14, a sensor array 16 and an output device 18. The system 12 includes a first subsystem 20 and a second subsystem 22.

In summary, the apparatus 10 is configured to receive signals from the sensor array 16 for one or more operational parameters of the system 12. The controller 14 is configured to process the received signals as described in the foregoing paragraphs to determine a signal value for a parameter. The controller 14 may be configured to control an action using the signal value. For example, the controller 14 may control the output device 18 to display the signal value. In another example, the controller 14 may control one or more of: the first subsystem 20 and the second subsystem 22 using the determined signal value.

In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 14, and the remaining features may be added by another manufacturer, or by an end user.

The controller 14, the sensor array 16, and the output device 18 may be wirelessly coupled to one another and may consequently comprise transceiver circuitry and one or more antennas. Additionally, or alternatively, the controller 14, the sensor array 16 and the output device 18 may be coupled to one another via wired links (for examples, metallic cables and/or optical fibre cables) and may consequently comprise interface circuitry (such as a Universal Serial Bus (USB) socket).

Figure 3:
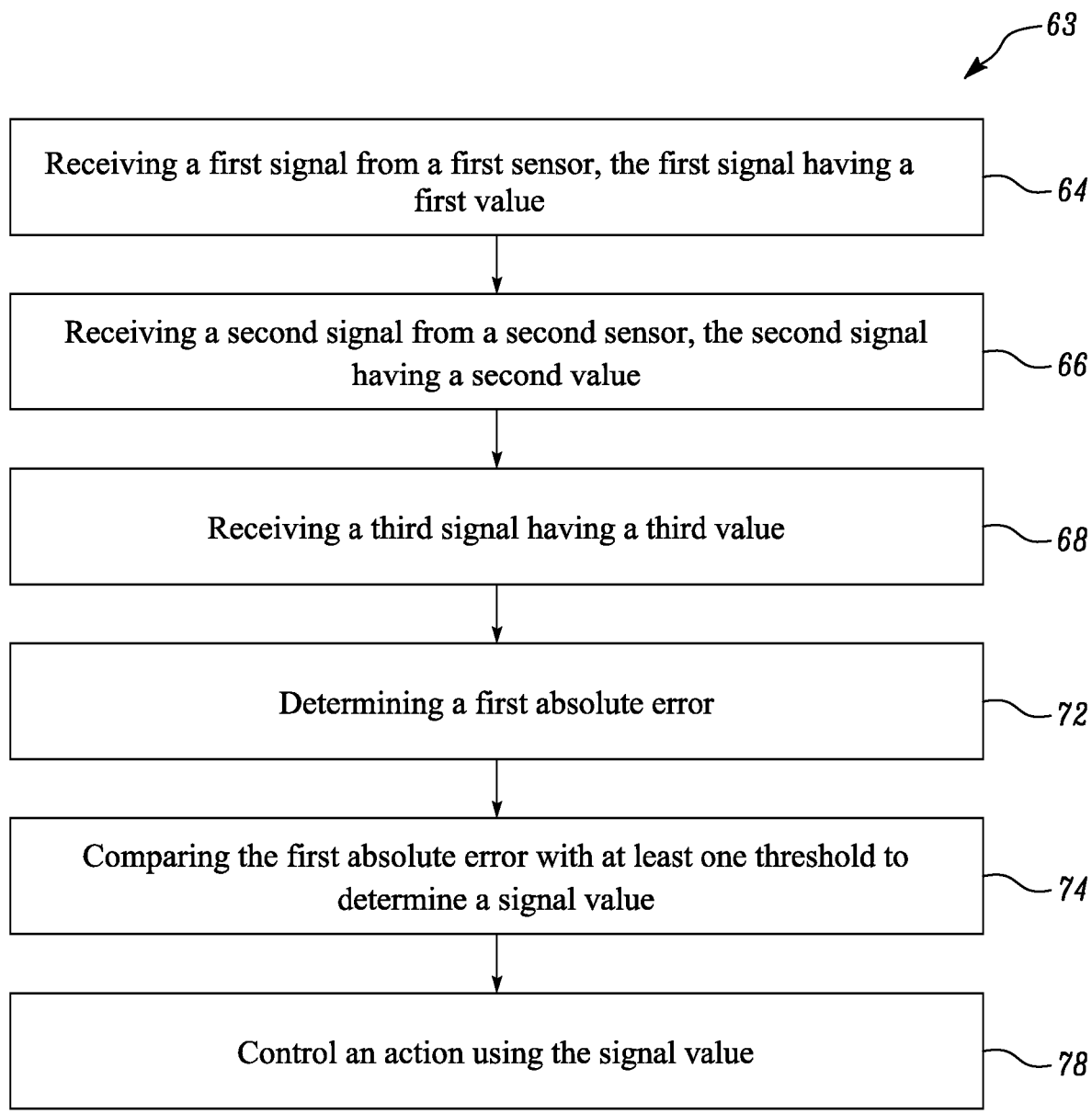
FIG. 3 illustrates a flow diagram of a computer-implemented method according to various examples.
Figure 4:
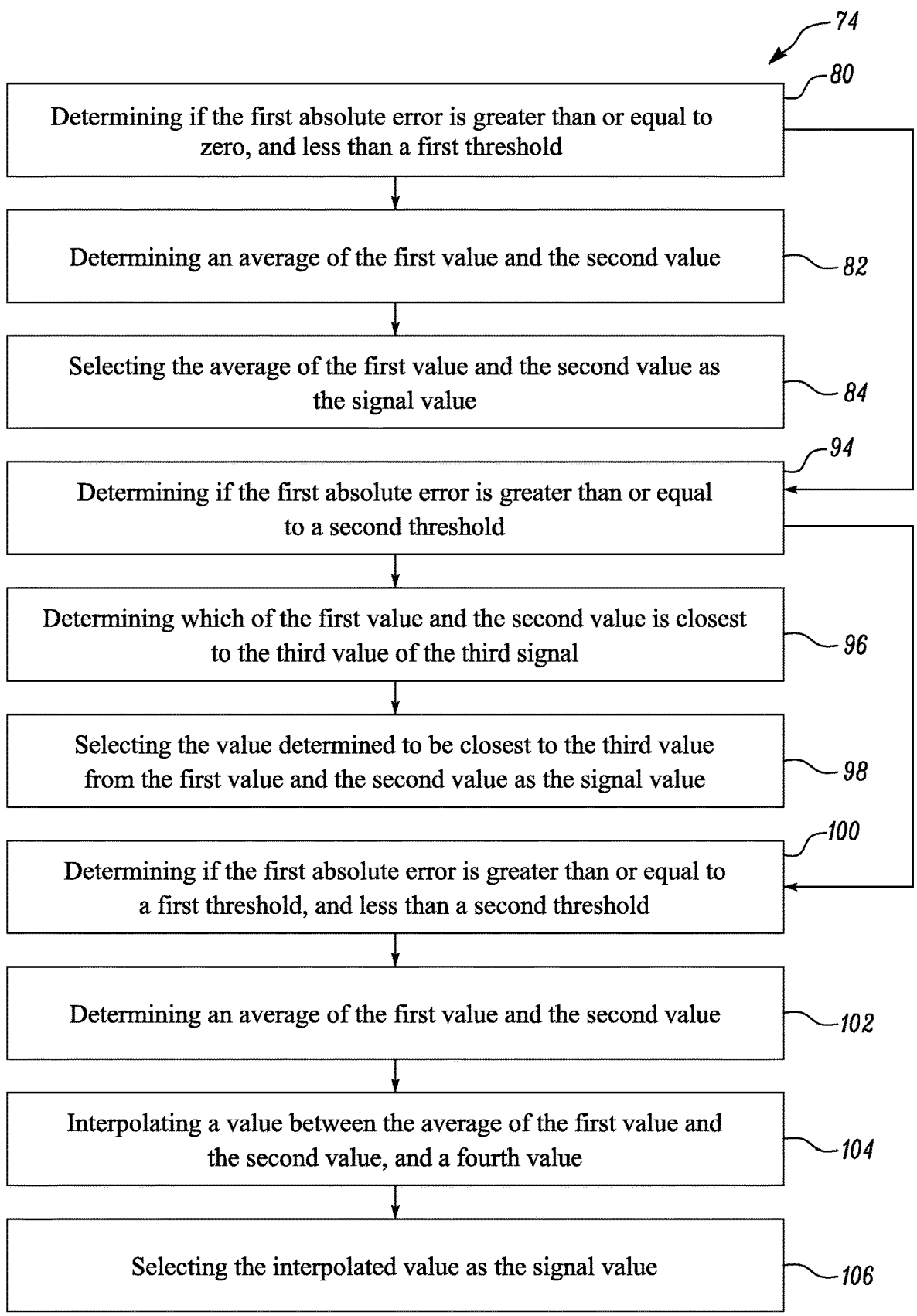
FIG. 4 illustrates a flow diagram of block 74 illustrated in FIG. 3 according to an example.

The controller 14 may comprise any suitable circuitry to cause performance of the methods described herein and as illustrated in FIGS. 3 and 4. The controller 14 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods. The controller 14 may be an electronic engine controller (EEC), an engine control unit (ECU) or a full authority digital engine controller (FADEC).

In various examples, the controller 14 may comprise at least one processor 24 and at least one memory 26. The memory 26 stores a computer program 28 comprising computer readable instructions that, when executed by the processor 24, causes performance of the methods described herein, and as illustrated in FIGS. 3 and 4. The computer program 28 may be software or firmware, or may be a combination of software and firmware.

The controller 14 may be located on the system 12, or may be located remote from the system 12, or may be distributed between the system 12 and a location remote from the system 12. The processor 24 may include at least one microprocessor and may comprise a single core processor, may comprise multiple processor cores (such as a dual core processor or a quad core processor), or may comprise a plurality of processors (at least one of which may comprise multiple processor cores).

The memory 26 may be any suitable non-transitory computer readable storage medium, data storage device or devices, and may comprise a hard disk and/or solid-state memory (such as flash memory). The memory 26 may be permanent non-removable memory, or may be removable memory (such as a universal serial bus (USB) flash drive or a secure digital card). The memory 26 may include: local memory employed during actual execution of the computer program 28; bulk storage; and cache memories which provide temporary storage of at least some computer readable or computer usable program code to reduce the number of times code may be retrieved from bulk storage during execution of the code.

The computer program 28 may be stored on a non-transitory computer readable storage medium 30. The computer program 28 may be transferred from the non-transitory computer readable storage medium 30 to the memory 26. The non-transitory computer readable storage medium 30 may be, for example, a USB flash drive, a secure digital (SD) card, an optical disc (such as a compact disc (CD), a digital versatile disc (DVD) or a Blu-ray disc). In some examples, the computer program 28 may be transferred to the memory 26 via a signal 32 (such as a wireless signal or a wired signal).

Input/output devices may be coupled to the controller 14 either directly or through intervening input/output controllers. Various communication adaptors may also be coupled to the controller 14 to enable the apparatus 10 to become coupled to other apparatus or storage devices through intervening private or public networks. Non-limiting examples include modems and network adaptors of such communication adaptors.

The sensor array 16 is configured to measure one or more parameters of the system 12 and transmit signals, comprising values for the one or more parameters, to the controller 14. For example, the sensor array 16 may be configured to measure any one or more of: pressure; temperature; humidity; velocity; vibration; acoustic waves; and electromagnetic waves. The sensor array 16 includes a first sensor 34, a second sensor 36 and may also include a third sensor 38 (or more sensors).

The sensor array 16 may be coupled to the system 12. For example, at least a part of the sensor array 16 may be embedded within one or more of the subsystems 20, 22 of the system 12. In other examples, the sensor array 16 may be positioned remotely from the system 12 and may not be coupled to the system 12 (for example, where the sensor array 16 measures acoustic waves or electromagnetic waves emitted by the system 12).

The output device 18 may comprise any suitable device for conveying information to a user. For example, the output device 18 may comprise a display such as a liquid crystal display, a light emitting diode display, an active matrix organic light emitting diode display, a thin film transistor display, a cathode ray tube display, or a mechanical display (such as a vane display or an analogue dial)), and/or a loudspeaker, and/or a printer (such as an inkjet printer or a laser printer), and/or a flight instrument. The controller 14 is configured to control the output device 18 to convey information to the user.

Figure 2:
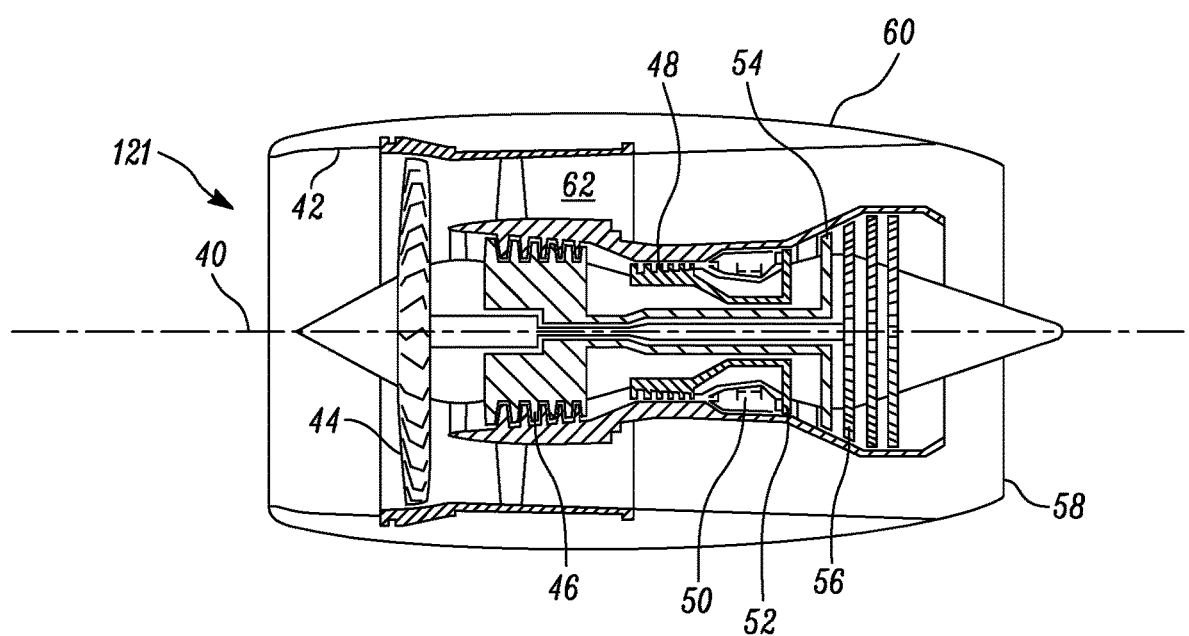
FIG. 2 illustrates a cross sectional side view diagram of a gas turbine engine according to an example.

The system 12 may be configured to generate, and/or distribute and/or receive power. For example, the system 12 may be configured to generate, and/or distribute, and/or receive mechanical power. Additionally, or alternatively, the system 12 may be configured to generate, and/or distribute, and/or receive electrical power. In some examples, the system 12 may include a gas turbine engine (for example, as illustrated in FIG. 2 and described below), a reciprocating engine, a wind turbine or an electrical machine (such as an electrical generator or an electrical motor). In other examples, the system 12 may be a nuclear power plant (such as a small modular reactor) or may be an electrical microgrid.

FIG. 2 illustrates a cross sectional side view of a gas turbine engine 121 according to an example. The gas turbine engine 121 has a rotational axis 40 and comprises a plurality of subsystems, namely (in axial flow series) an air intake 42, a propulsive fan 44, an intermediate pressure compressor 46, a high-pressure compressor 48, combustion equipment 50, a high-pressure turbine 52, an intermediate pressure turbine 54, a low-pressure turbine 56 and an exhaust nozzle 58. A nacelle 60 generally surrounds the engine 121 and defines both the intake 42 and the exhaust nozzle 58.

In operation, air entering the intake 42 is accelerated by the fan 44 to produce two air flows: a first air flow into the intermediate pressure compressor 46 and a second air flow which passes through a bypass duct 62 to provide propulsive thrust. The intermediate pressure compressor 46 compresses the air flow directed into it before delivering that air to the high-pressure compressor 48 where further compression takes place.

The compressed air exhausted from the high-pressure compressor 48 is directed into the combustion equipment 50 where it is mixed with fuel and the mixture combusted. The resultant hot combustion products then expand through, and thereby drive the high-pressure turbine 52, intermediate-pressure turbine 54 and low-pressure turbine 56 before being exhausted through the nozzle 58 to provide additional propulsive thrust. The high-pressure turbine 52, the intermediate-pressure turbine 54 and the low-pressure turbine 56 drive respectively the high-pressure compressor 48, intermediate pressure compressor 46 and fan 44, each by an interconnecting shaft.

Other gas turbine engines to which the present disclosure may be applied may have alternative configurations. By way of example, such engines may have an alternative number of interconnecting shafts (two for example) and/or an alternative number of compressors and/or turbines. Further the engine may comprise a gearbox provided in the drive train from a turbine to a compressor and/or fan.

FIG. 3 illustrates a flow diagram of a computer-implemented method 63 according to various examples.

At block 64, the method includes receiving a first signal from a first sensor, the first signal having a first value and being a measurement of a first parameter of a system. For example, the controller 14 may receive a first signal from the first sensor 34 of the sensor array 16 for a first parameter of the system 12. Where the system 12 comprises a gas turbine engine (such as the gas turbine engine 121), the first parameter may be the total pressure at the outlet of the high-pressure compressor 48 (also known as P30).

At block 66, the method includes receiving a second signal from a second sensor, the second signal having a second value and being a measurement of the first parameter of the system (that is, the first signal and the second signal are measurements of the same parameter of the same system). For example, the controller 14 may receive a second signal from the second sensor 36 of the sensor array 16 for the first parameter of the system 12.

At block 68, the method includes receiving a third signal having a third value. The third signal may be a modelled signal (that is, an arbitration signal that is derived from an independent related measurement to give an approximation of the expected measurement value). For example, the controller 14 may be configured to receive a signal from the third sensor 38 of the sensor array 16, determine a modelled signal using the signal received from the third sensor 38, and receive the modelled signal as an output from the determination. Alternatively, the third value may be determined prior to commencement of the method 63 and may be stored as data 70 in the memory 26. In these examples, the controller 14 receives the third signal by reading the third value data 70 from the memory 26.

At block 72, the method includes determining a first absolute error using the first value, the second value and the third value. The first absolute error may be expressed by the following equation:

$$AbEr1=||v1-v3|-|v2-v3|| \qquad \text{Equation 5}$$

Where AbEr1 is the first absolute error, v1 is the first value, v2 is the second value and v3 is the third value.

Alternatively, the first absolute error may be expressed by the following equation:

$$AbEr1=|AbEr2-AbEr3| \qquad \text{Equation 2}$$

Where:

$$AbEr2=|v1-v3| \qquad \text{Equation 3}$$

And where:

$$AbEr3=|v2-v3| \qquad \text{Equation 4}$$

The controller 14 may determine the first absolute error by calculating AbEr1 using equation 1. Alternatively, the controller 14 may determine the first absolute error AbEr1 by first calculating the second absolute error AbEr2 using equation 3 and the third absolute error AbEr3 using equation 4, and then calculating AbEr1 using equation 2.

At block 74, the method includes comparing the first absolute error with at least one threshold to determine a signal value. For example, the controller 14 may compare the first absolute error with at least one threshold 76 stored in the memory 26 to determine a signal value.

By way of an example, where the controller 14 determines that the first absolute error is less than a threshold 76, the controller 14 may determine that the signal value is the average value of the first value and the second value. Where the controller 14 determines that the first absolute error is greater than the threshold 76, the controller 14 may determine that the signal value is whichever of the first value and the second value is closest to the third value.

At block 78, the method includes controlling an action using the signal determined at block 74. For example, the controller 14 may control the output device 18 to display the determined signal value to a user of the system 10. In another example, the controller 14 may compare the determined signal value with one or more threshold values, and where the determined signal value exceeds or falls below the threshold, the controller 14 may control one or more of the subsystems 20, 22 to decrease or increase the signal value respectively. For example, where the signal value is a measure of P30 of a gas turbine engine, the controller 14 may modulate the flow of fuel to the combustion equipment 50 to increase or decrease P30.

The method illustrated in FIG. 3 may be advantageous when one of the first signal and the second signal becomes erroneous, but not sufficiently in error to be detected by a wide band range check (such faults are often referred to as in-range faults). The comparison of the first signal and the second signal with a third signal (for example, a modelled signal) to calculate an absolute error enables a signal value to be determined, despite one of the first signal and the second signal being in error. For example, and as mentioned above, the signal value may be determined as the average value of the first value and the second value where the first absolute error is less than a threshold, and may be determined as the signal value closest to the third value where the first absolute error is greater than the threshold.

FIG. 4 illustrates a flow diagram of a computer-implemented method of comparing the first absolute error with at least one threshold to determine a signal value (that is, block 74 of FIG. 3) according to an example.

At block 80, the method includes determining if the first absolute error is greater than or equal to zero, and less than a first threshold. For example, the controller 14 may determine if the first absolute error is greater than or equal to zero, and less than a first threshold. With reference to the examples illustrated in FIGS. 5 to 8, the first threshold is fifteen.

Where it is determined that the first absolute error is greater than or equal to zero, and less than a first threshold, the method moves to block 82, and includes determining an average of the first value and the second value. For example, the controller 14 may determine the average of the first value and the second value received from the first sensor 34 and the second sensor 36 respectively.

At block 84, the method includes selecting the average of the first value and the second value as the signal value. For example, the controller 14 may select the average determined at block 82 as the signal value.

Figure 5:
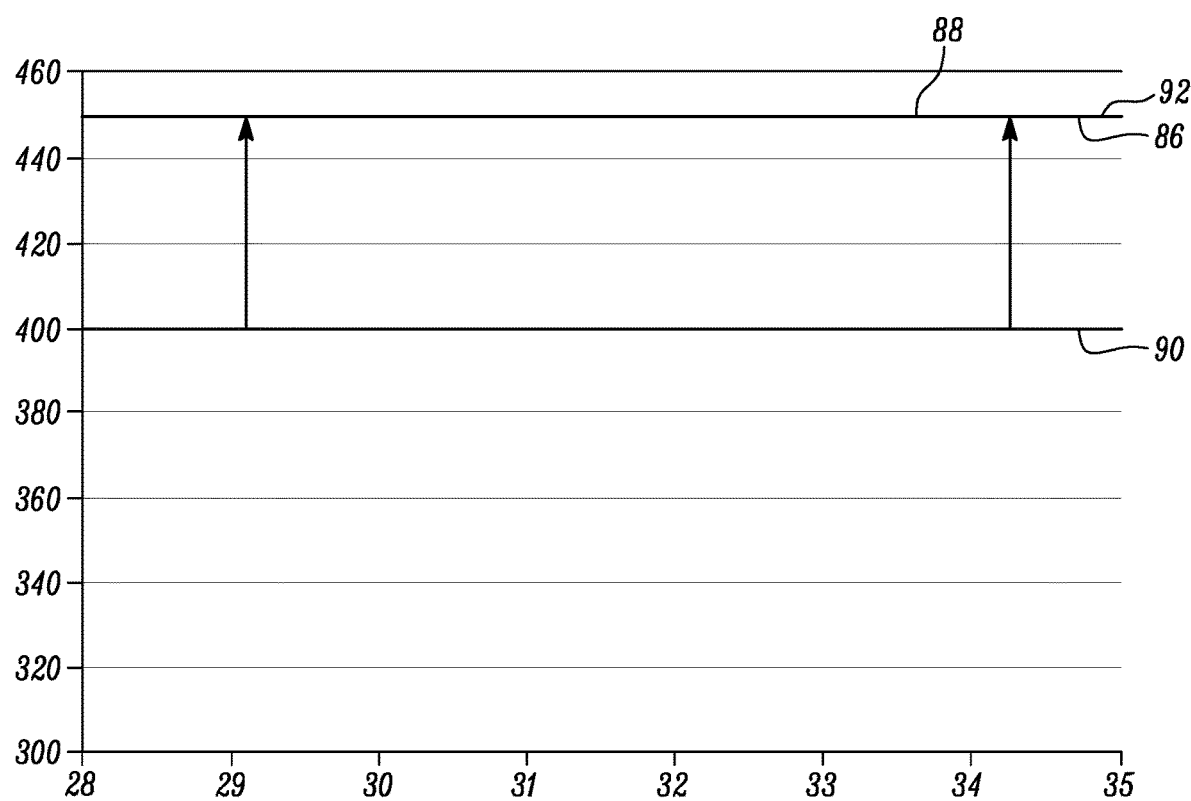
FIG. 5 illustrates a graph of signal amplitude versus time for the first signal, the second signal, and the third signal according to a first example.

FIG. 5 illustrates a graph of signal amplitude versus time for the first signal, the second signal, and the third signal according to a first example. In more detail, FIG. 5 illustrates the first signal 86 having a first value of four hundred and fifty, the second signal 88 having a second value of four hundred and fifty, and a third signal 90 having a third value of four hundred. In this example, the first absolute error is equal to zero because the second absolute error is equal to fifty and the third absolute error is equal to fifty. As the absolute error is equal to zero and is therefore greater than or equal to zero, and less than a first threshold, the average of the first value and the second value is selected as the signal value 92 (that is, the signal value 92 is equal to four hundred and fifty).

Figure 6:
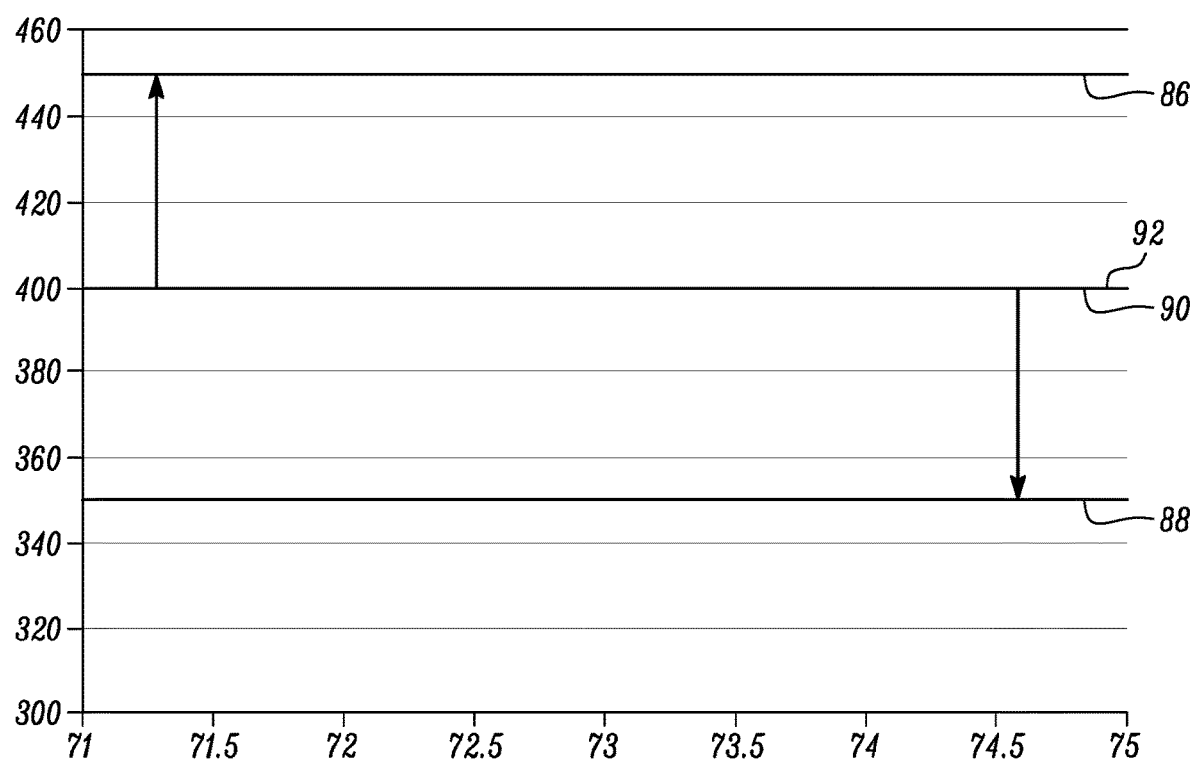
FIG. 6 illustrates a graph of signal amplitude versus time for the first signal, the second signal, and the third signal according to a second example.

FIG. 6 illustrates a graph of signal amplitude versus time for the first signal, the second signal, and the third signal according to a second example. In more detail, the graph illustrates the first signal 86 having a first value of four hundred and fifty, the second signal 88 having a second value of three hundred and fifty, and a third signal 90 having a third value of four hundred. In this example, the first absolute error is equal to zero because the second absolute error is equal to fifty and the third absolute error is equal to fifty. As the first absolute error is equal to zero and is therefore greater than or equal to zero, and less than a first threshold, the average of the first value and the second value is selected as the signal value 92 (that is, the signal value 92 is equal to four hundred).

Returning to FIG. 4, where it is determined at block 80 that the first absolute error is not greater than or equal to zero, and less than a first threshold, the method moves to block 94.

At block 94, the method includes determining if the first absolute error is greater than or equal to a second threshold. For example, the controller 14 may determine if the first absolute error is greater than or equal to a second threshold. With reference to the examples illustrated in FIGS. 5 to 8, the second threshold is forty five.

Where it is determined that the first absolute error is greater than or equal to a second threshold, the method moves to block 96, and includes determining which of the first value and the second value is closest to the third value of the third signal. For example, the controller 14 may determine which of the first value received from the first sensor 34 and the second value received from the second sensor 36 is closest to the third value.

At block 98, the method includes selecting the value determined to be closest to the third value from the first value and the second value as the signal value. For example, the controller 14 may select the first value or the second value determined at block 96 as the signal value.

Figure 7:
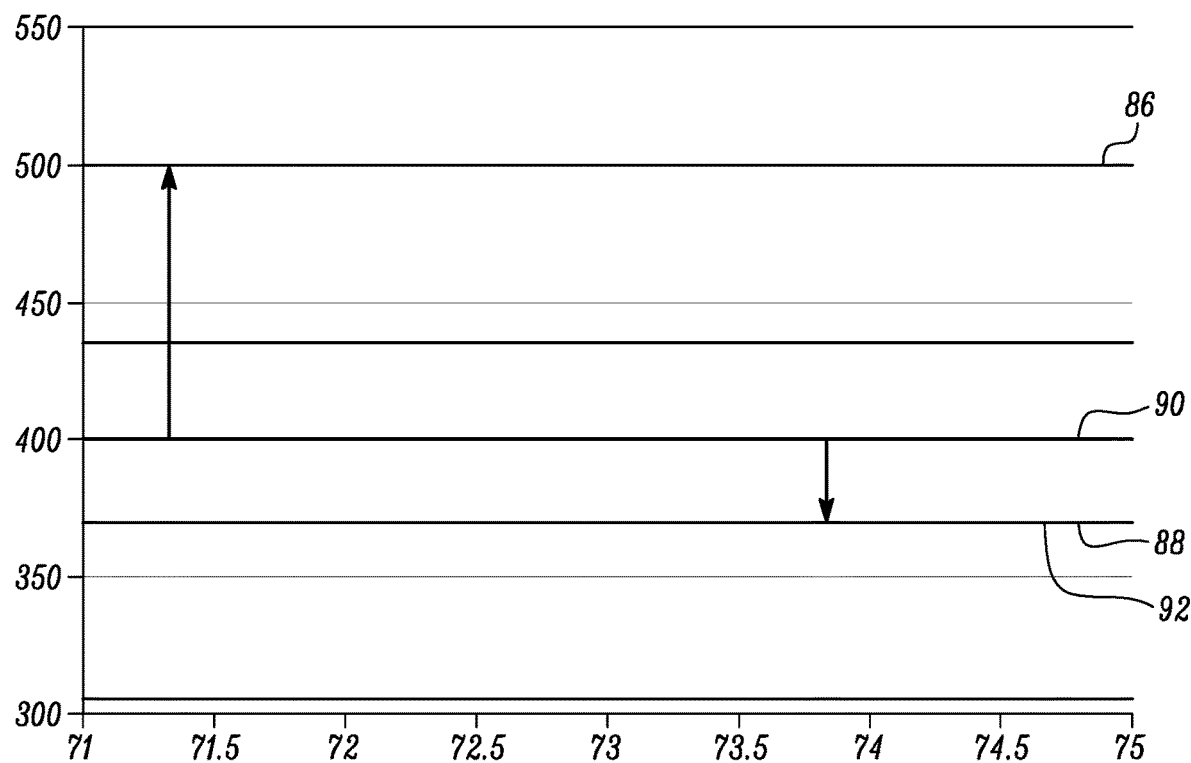
FIG. 7 illustrates a graph of signal amplitude versus time for the first signal, the second signal, and the third signal according to a third sample.

FIG. 7 illustrates a graph of signal amplitude versus time for the first signal, the second signal, and the third signal according to a third example. In more detail, the graph illustrates the first signal 86 having a first value of five hundred, the second signal 88 having a second value of three hundred and seventy, and a third signal 90 having a third value of four hundred. In this example, the first absolute error is equal to seventy because the second absolute error is equal to one hundred and the third absolute error is equal to thirty. As the first absolute error is greater than the second threshold of forty five, the second value of the second signal is selected as the signal value 92 (that is, the signal value 92 is equal to three hundred and seventy) because the second value is closest in value to the third value. It should be noted that the signal value 92 in this example is different to the average of the first value and the second value (three hundred and seventy compared with four hundred and thirty five respectively).

Returning to FIG. 4, where it is determined at block 94 that the first absolute error is not greater than or equal to the second threshold, the method moves to block 100.

At block 100, the method includes determining if the first absolute error is greater than or equal to the first threshold, and less than the second threshold. For example, the controller 14 may determine if the first absolute error is greater than or equal to the first threshold, and less than the second threshold. In the examples illustrated in FIGS. 5 to 8 and as described in the preceding paragraphs, the first threshold is fifteen and the second threshold is forty five.

Where it is determined that the first absolute error is greater than or equal to a second threshold, the method moves to block 102, and includes determining an average of the first value and the second value. For example, the controller 14 may determine the average of the first value and the second value received from the first sensor 34 and the second sensor 36 respectively.

At block 104, the method includes interpolating a value between the average of the first value and the second value, and a fourth value. For example, the controller 14 may interpolate a value between the average of the first value and the second value, and a fourth value using the equation 5:

$$\text{Interpolated Value} = ((1-IF) \times AvV) + (IF \times FourthV) \qquad \text{Equation 5}$$

Where IF is an interpolation factor, AvV is the average of the first value and the second value, and FourthV is the fourth value.

The fourth value may be determined according to various different methods. For example, the controller 14 may determine which of the first value and the second value is closest to the third value of the third signal, and the controller 14 may use the value determined to be closest to the third value as the fourth value.

By way of another example, the controller 14 may determine which of the first value and the second value is highest, and the controller 14 may use the value determined to have the highest value as the fourth value.

By way of a further example, the controller 14 may determine which of the first value and the second value is lowest, and the controller 14 may use the value determined to have the lowest value as the fourth value.

By way of another example, the memory 26 may store a predetermined value and the controller 14 may use the stored predetermined value as the fourth value.

The interpolation factor (IF) may be calculated using various different equations. For example, the interpolation factor may be calculated using the equation for a straight line:

$$IF = m \times AbEr1 + c \qquad \text{Equation 6}$$

Where IF is the interpolation factor, m is a constant (representing the gradient of the straight line), AbEr1 is the first absolute error, and c is a constant.

Figure 8:
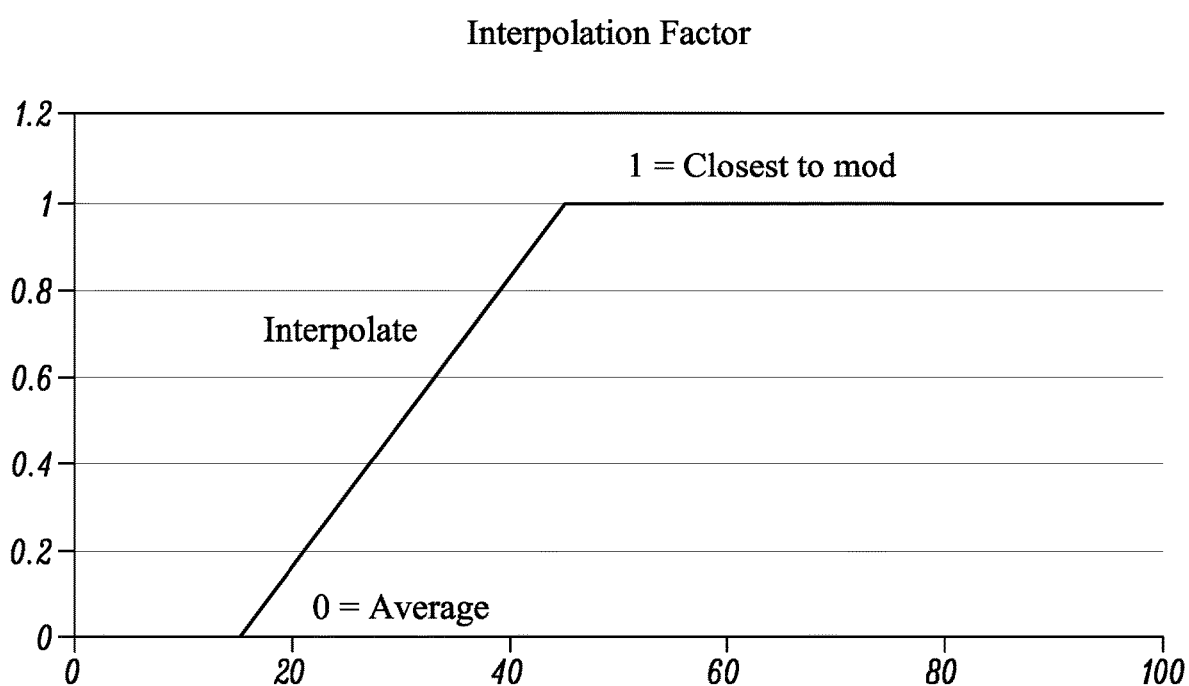
FIG. 8 illustrates a graph of interpolation factor versus the first absolute error according to an example.

For example, FIG. 8 illustrates a graph of interpolation factor versus the first absolute error according to an example. The interpolation factor has a value of zero between first absolute error values of zero and fifteen (that is, the first threshold), has a value of one where the first absolute error is greater than forty five (that is, the second threshold), and is represented by a straight line having a positive gradient between the first absolute error values of fifteen and forty five.

At block 106, the method includes selecting the interpolated value as the signal. For example, the controller 14 may select the interpolated value from equation 5 and determined at block 104 as the signal value.

The method illustrated in FIG. 4 and described above may be advantageous in that the interpolation at block 104 and the selection of the interpolated value at block 106 results the determined signal value smoothly transitioning between the average value and the fourth value as the first absolute error increases or decreases between the first threshold and the second threshold.

It should be appreciated that the methods illustrated in FIGS. 3 and 4 may be performed 'offline' on data which has been measured and recorded previously. Alternatively, the methods illustrated in FIGS. 3 and 4 may be performed in 'real-time', that is, concurrently with the receipt of the data by the controller 14.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

What is claimed is:

1. A computer-implemented method comprising:
   receiving a first signal from a first sensor, the first signal having a first value;
   receiving a second signal from a second sensor, the second signal having a second value, the first signal and the second signal being measurements of a parameter of a system;
   receiving a third signal having a third value;
   determining a first absolute error, which is a numerical value calculated from a preset formula that includes all of the first value, the second value and the third value; and
   comparing the first absolute error with at least one threshold to determine a signal value.

2. The computer-implemented method of claim 1, wherein determining the first absolute error comprises:
   calculating a second absolute error which is an absolute value difference between the first value and the third value;
   calculating a third absolute error which is an absolute value difference between the second value and the third value; and
   calculating the first absolute error which is an absolute value difference between the second absolute error and the third absolute error.

3. The computer-implemented method as claimed in claim 1, wherein comparing the first absolute error with at least one threshold comprises:
   determining if the first absolute error is greater than or equal to zero, and less than a first threshold;
   determining an average of the first value and the second value when the first absolute error is determined to be greater than or equal to zero, and less than the first threshold; and
   selecting the average of the first value and the second value as the signal value.

4. The computer-implemented method as claimed in claim 1, wherein comparing the first absolute error with at least one threshold comprises:
   determining if the first absolute error is greater than or equal to a second threshold;
   determining which of the first value and the second value is closest to the third value of the third signal when the first absolute error is determined to be greater than or equal to the second threshold; and
   selecting the value determined to be closest to the third value from the first value and the second value as the signal value.

5. The computer-implemented method as claimed in claim 1, wherein comparing the first absolute error with at least one threshold comprises:
   determining if the first absolute error is greater than or equal to a first threshold, and less than a second threshold;
   determining an average of the first value and the second value when the first absolute error is determined to be greater than or equal to the first threshold, and less than the second threshold; and
   interpolating a value between the average of the first value and the second value, and a fourth value; and
   selecting the interpolated value as the signal value.

6. The computer-implemented method as claimed in claim 5, wherein comparing the first absolute error with at least one threshold further comprises:
   determining which of the first value and the second value is closest to the third value of the third signal when the first absolute error is determined to be greater than or equal to the first threshold, and less than the second threshold, the fourth value being the value determined to be closest to the third value of the third signal.

7. The computer-implemented method as claimed in claim 5, wherein comparing the first absolute error with at least one threshold further comprises:
   determining which of the first value and the second value is highest, the fourth value being the value determined to be the highest value.

8. The computer-implemented method as claimed in claim 5, wherein comparing the first absolute error with at least one threshold further comprises:
   determining which of the first value and the second value is lowest, the fourth value being the value determined to be the lowest value.

9. The computer-implemented method as claimed in claim 5, wherein the fourth value is a predetermined value stored in a memory.

10. A non-transitory computer readable storage medium comprising computer readable instructions that, when executed by a computer, cause performance of the method as claimed in claim 1.

11. An apparatus comprising:
    a controller comprising at least one processor and at least one memory, the memory storing a computer program comprising computer readable instructions that, when executed by the processor, causes the controller to:
    receive a first signal from a first sensor, the first signal having a first value;
    receive a second signal from a second sensor, the second signal having a second value, the first signal and the second signal being measurements of a parameter of a system;
    receive a third signal having a third value;
    determine a first absolute error, which is a numerical value calculated from a preset formula that includes all of the first value, the second value and the third value; and
    compare the first absolute error with at least one threshold to determine a signal value.

12. The apparatus as claimed in claim 11, wherein to compare the first absolute error with at least one threshold, the controller is caused to:
    determine if the first absolute error is greater than or equal to zero, and less than a first threshold;
    determine an average of the first value and the second value when the first absolute error is determined to be greater than or equal to zero, and less than the first threshold; and
    select the average of the first value and the second value as the signal value.

13. The apparatus as claimed in claim 11, wherein to compare the first absolute error with at least one threshold, the controller is caused to:
    determine if the first absolute error is greater than or equal to a second threshold;
    determine which of the first value and the second value is closest to the third value of the third signal when the first absolute error is determined to be greater than or equal to the second threshold; and
    select the value determined to be closest to the third value from the first value and the second value as the signal value.

14. The apparatus as claimed in claim 11, wherein to compare the first absolute error with at least one threshold, the controller is caused to:
- determine if the first absolute error is greater than or equal to the first threshold, and less than the second threshold;
- determine an average of the first value and the second value when the first absolute error is determined to be greater than or equal to the first threshold, and less than the second threshold; and
- interpolate a value between the average of the first value and the second value, and a fourth value; and
- select the interpolated value as the signal value.

15. The apparatus as claimed in claim 14, wherein to compare the first absolute error with at least one threshold, the controller is caused to:
- determine which of the first value and the second value is closest to the third value of the third signal when the first absolute error is determined to be greater than or equal to the first threshold, and less than the second threshold, the fourth value being the value determined to be closest to the third value of the third signal.

16. The apparatus as claimed in claim 14, wherein to compare the first absolute error with at least one threshold, the controller is caused to:
- determine which of the first value and the second value is highest, the fourth value being the value determined to be the highest value.

17. The apparatus as claimed in claim 14, wherein to compare the first absolute error with at least one threshold, the controller is caused to:
- determine which of the first value and the second value is lowest, the fourth value being the value determined to be the lowest value.

18. The apparatus as claimed in claim 14, wherein the fourth value is a predetermined value stored in a memory.

* * * * *